Aug. 12, 1958     J. SEVERIN     2,846,895
GEAR MECHANISM
Filed March 31, 1954     5 Sheets-Sheet 1

INVENTOR.
JOSE SEVERIN
BY
ATTORNEY

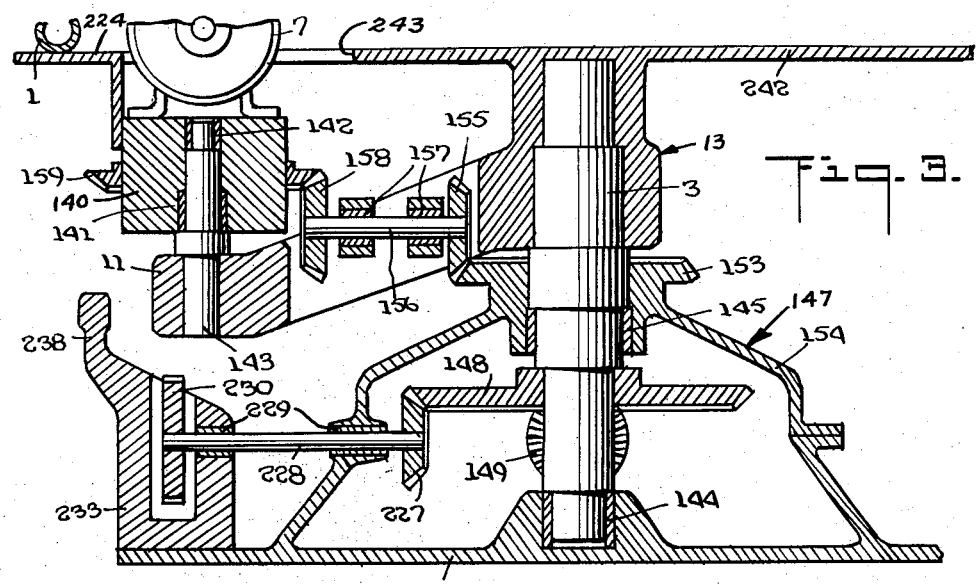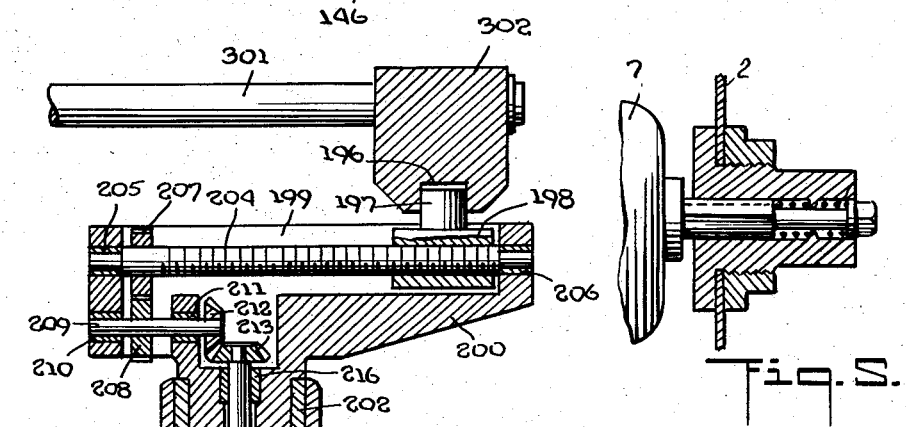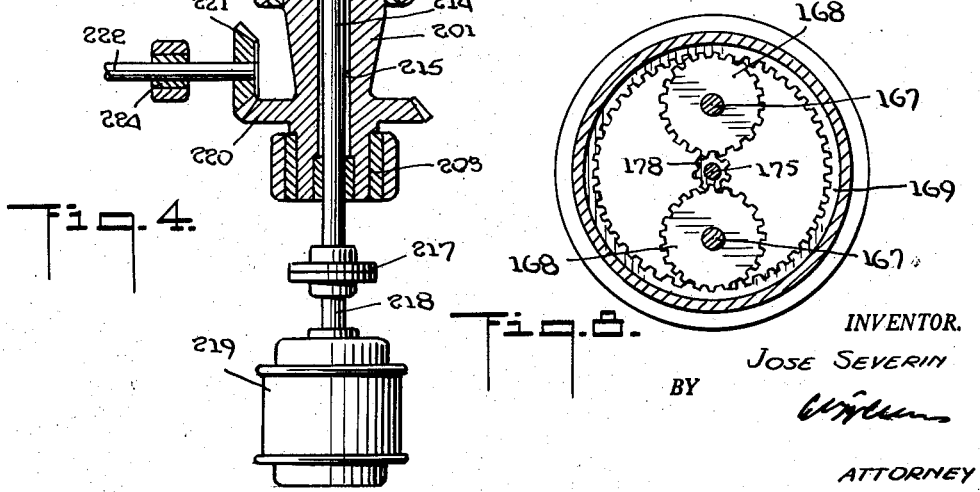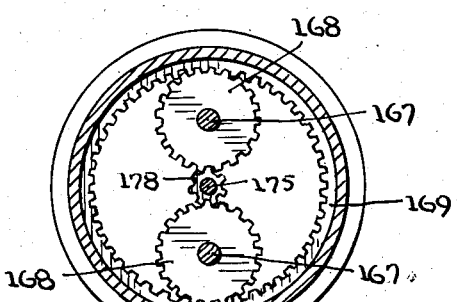

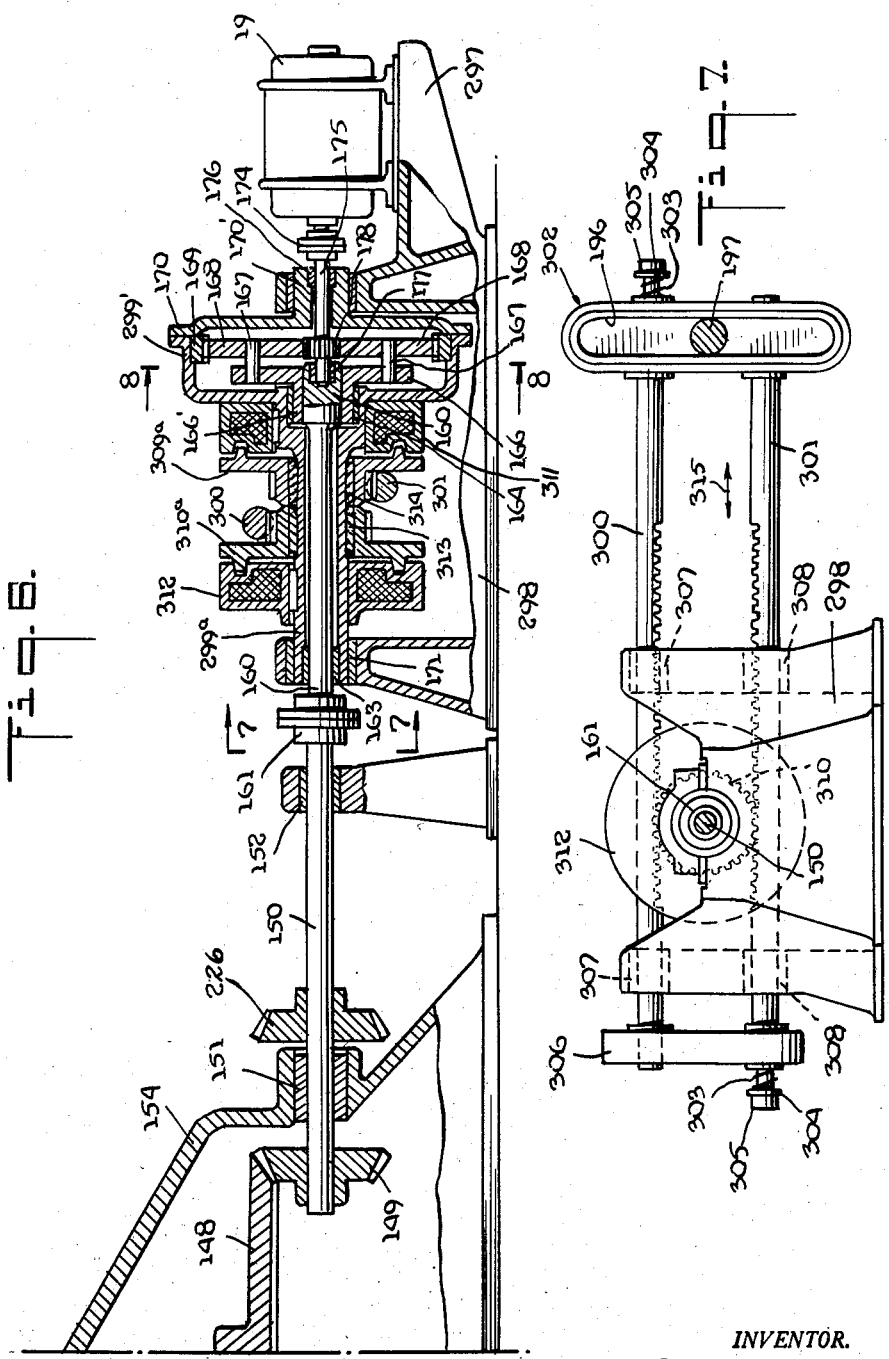

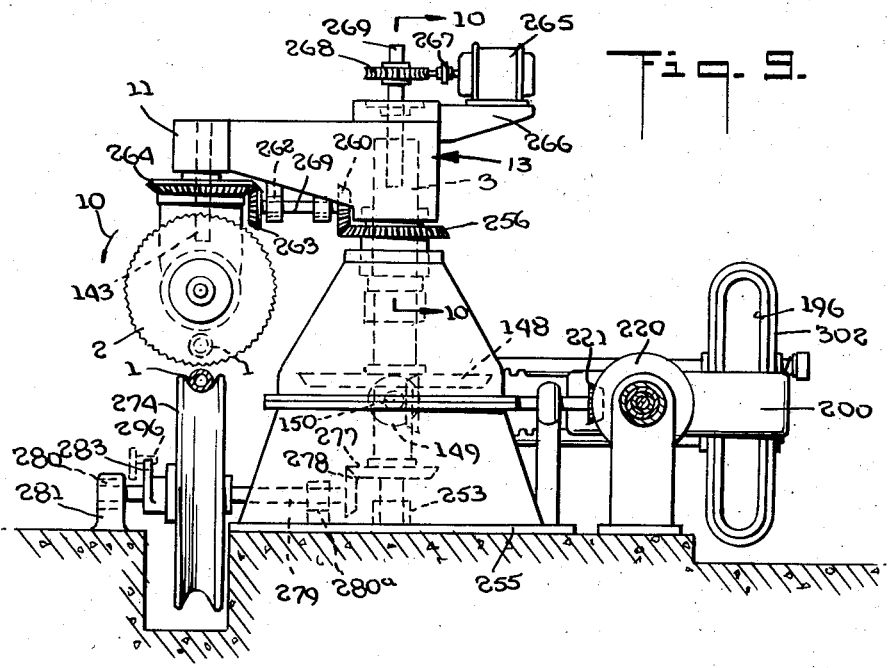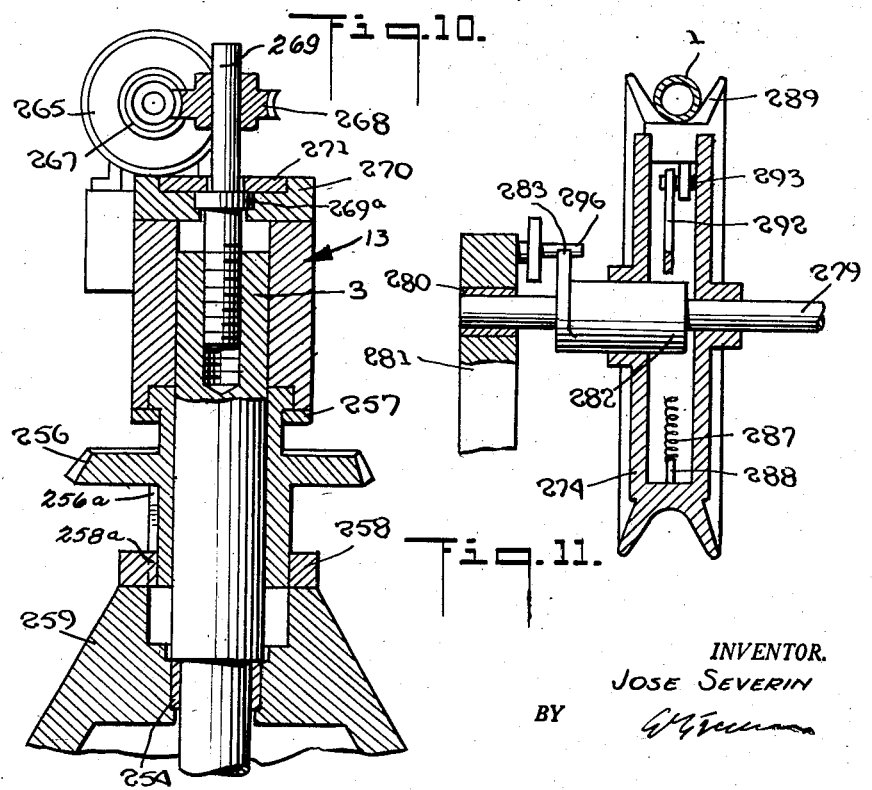

Aug. 12, 1958 J. SEVERIN 2,846,895
GEAR MECHANISM
Filed March 31, 1954 5 Sheets-Sheet 5
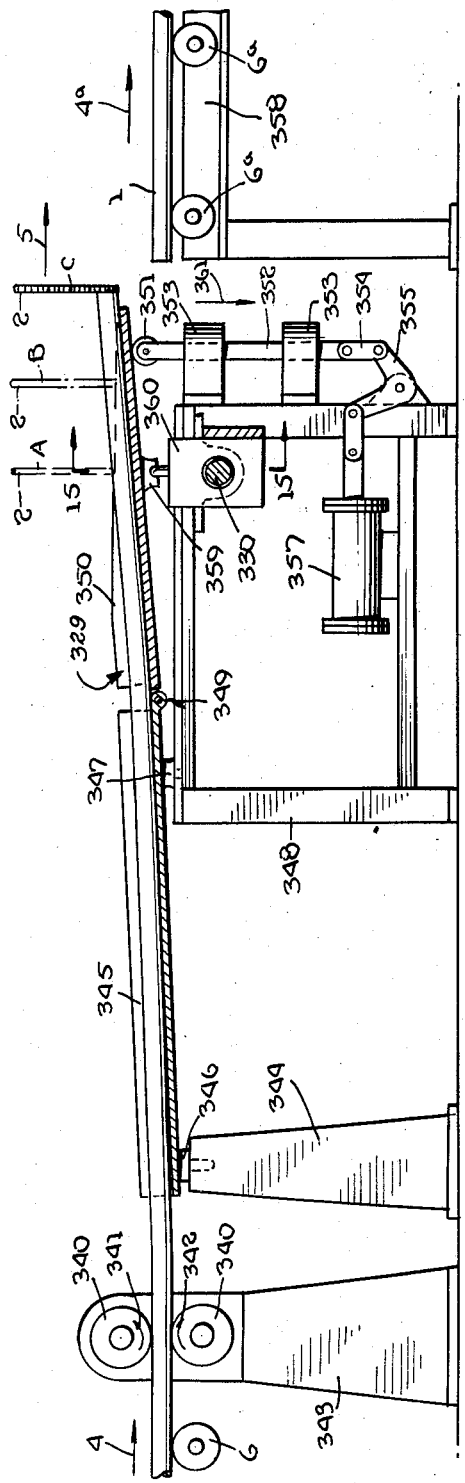
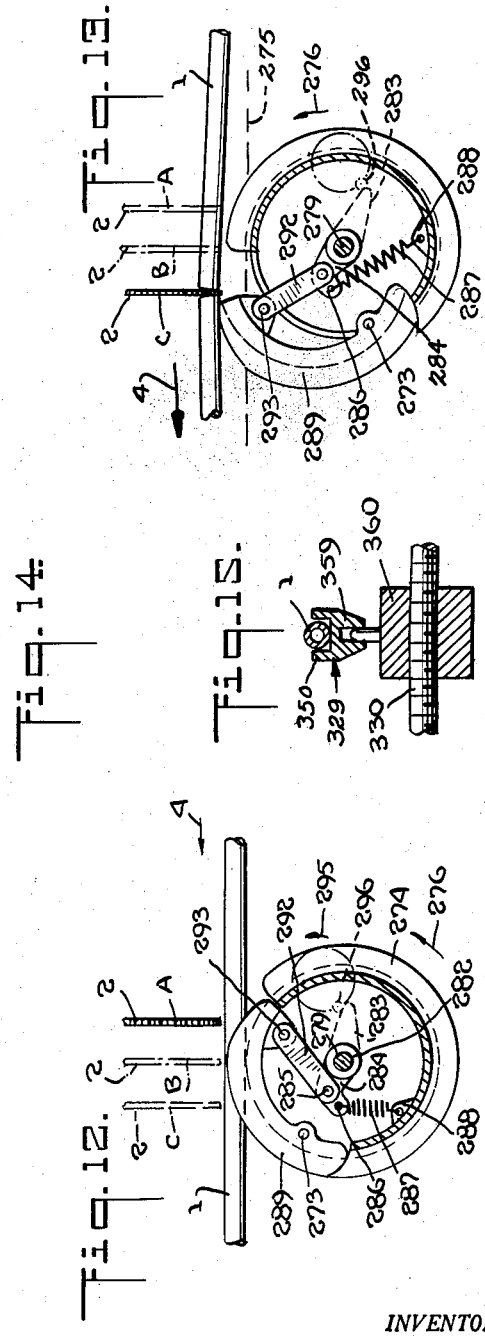
INVENTOR.
JOSE SEVERIN
BY
ATTORNEY

United States Patent Office 2,846,895
Patented Aug. 12, 1958

2,846,895
GEAR MECHANISM

Jose Severin, Duisburg, Germany, assignor to Friedrich Kocks G. m. b. H., Dusseldorf, Germany Application March 31, 1954, Serial No. 420,101

Claims priority, application Germany April 5, 1949

1 Claim. (Cl. 74—394)

This invention relates to a gear mechanism, particularly of the type that may advantageously be used for a flying saw apparatus which severs stock such as pipes and tubes during advance movement of the stock from a rolling mill. This is a continuation-in-part application of my copending application Serial No. 150,857, filed March 21, 1950, now Patent No. 2,709,846 issued June 7, 1955.

The main novel feature of the present invention resides in a gearing arrangement for rotating the arm which carries the saw blade at varying angular velocity throughout its cycle of rotation so as to vary the length of the segments into which the stock is severed. That is, during the cutting portion of the cycle of rotation when the saw blade is cutting through the advancing stock, the gear means will cause the saw blade to rotate about the center of the blade carrying arm at an angular velocity so as to move forwardly with the stock at the same rate of speed as the stock. However, during the remaining non-cutting portion of the cycle of rotation, the saw blade angular velocity is increased, or decreased. If increased, the length of the cut stock segments will be shorter since the stock advances at a constant speed and less stock is advanced during the shorter time interval of the non-cutting portion of the cycle of rotation. If the saw blade angular velocity is decreased during this non-cutting portion of the cycle, the stock segments will be longer.

To accomplish this novel mode of operation, the present invention comprises a differential drive means for rotating the saw blade arm in a non-uniform circular motion.

Other objects and advantages of the present invention are inherent in the structure as claimed and disclosed or will become apparent to those skilled in the art as the detailed description proceeds in connection with the accompanying drawings wherein:

Fig. 3 is a vertical sectional view on line 3—3 of Fig. 2;

Fig. 4 is a horizontal sectional view on line 4—4 of Fig. 1;

Fig. 5 is a sectional detail view of the means for mounting the saw blade to the shaft of its motor;

Fig. 6 is a vertical sectional view on line 6—6 of Fig. 1;

Fig. 7 is a vertical sectional view on line 7—7 of Fig. 6;

Fig. 8 is a vertical sectional view on line 8—8 of Fig. 6;

Fig. 9 is a side elevational view of a second embodiment of the invention;

Fig. 10 is a vertical sectional view on line 10—10 of Fig. 9;

Fig. 11 is a sectional detail view of the cam means for raising the stock into engagement with the saw blade of Fig. 9;

Fig. 12 is a side elevational view of said cam means in its normal position;

Fig. 13 is a view similar to Fig. 12 but shows the cam means in its operative position to raise the stock;

Fig. 14 is an elevational view of another modification and shows a different means for raising the stock into engagement with the saw blade of the apparatus in Fig. 9; and Fig. 15 is a sectional view on line 15—15 of Fig. 14.

Figures 1, 2:
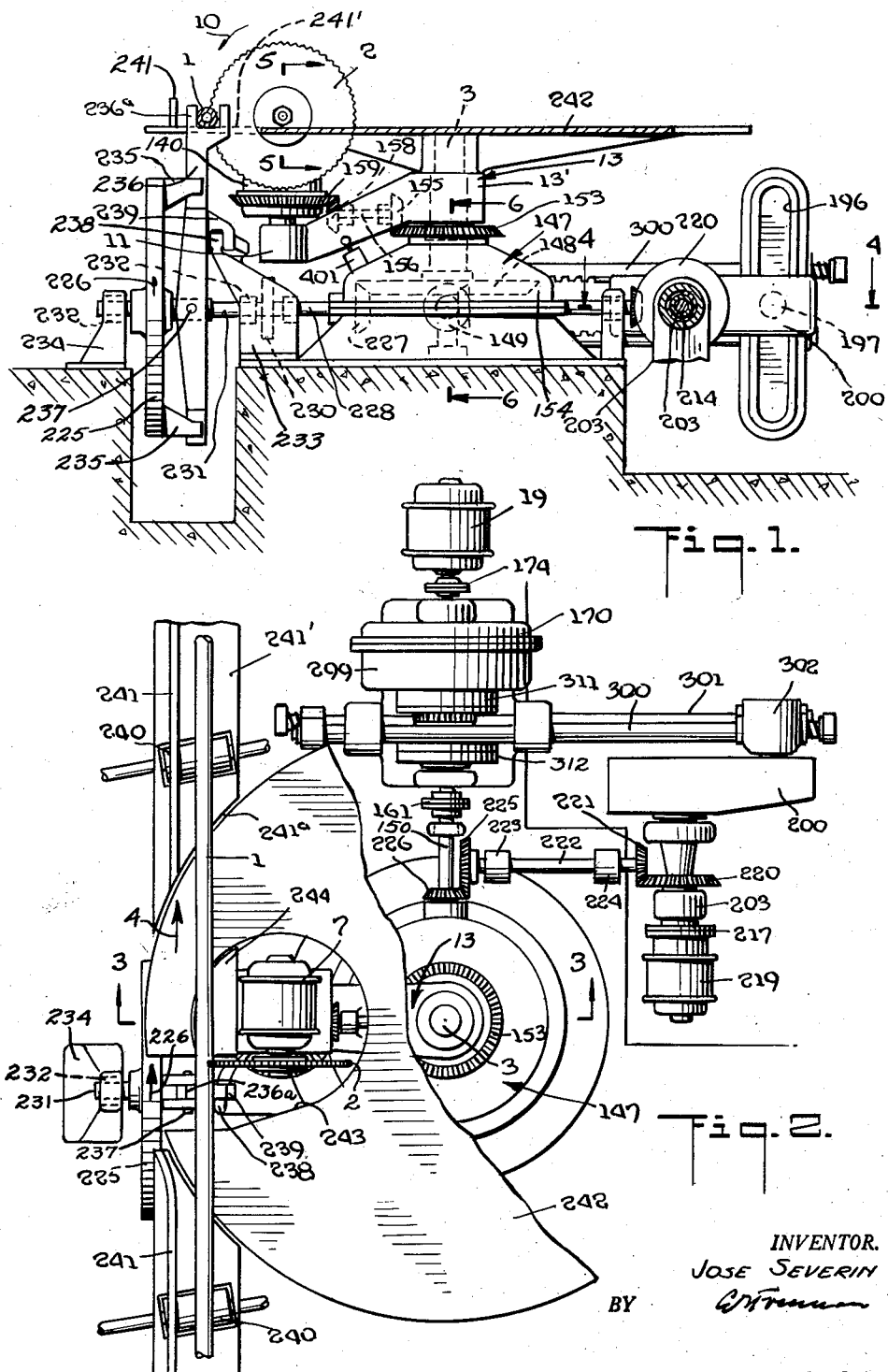
Fig. 1 is a side elevational view of an apparatus in accordance with the present invention.
Fig. 2 is a top plan view of the apparatus of Fig. 1 with the rotary table broken away.

In conformity with the embodiment of the invention shown in Figs. 1-8 the saw blade 2 revolves in a horizontal plane about center shaft or pivot 3; the severing of the stock in the form of rod 1 is effected by its transport towards the saw 2. The speed of the revolving saw is equal to the advance speed of the rolling stock only during the cutting part of the cycle. The different lengths of the stock segments is produced by an acceleration or retardation of the revolving speed of the saw 2 during the non-cutting portion of the cycle of rotation by the actuation of a crank-operated differential gear mechanism located between the main drive motor and the main drive.

The saw blade 2 is supported on the shaft of motor 7 in the manner shown in Fig. 5. Motor 7 is located on a support 140 (Fig. 3). The latter is rotated by means of bearings 141, 142 about pivot 143 which is fixedly mounted on head 11. This head 11 is mounted on the outer end of revolving arm 13. The hub 13' of this is fixedly mounted on center pivot 3. The latter is rotatably mounted in bearings 144, 145 in a housing composed of base 146 and support 147. To the center pivot 3 there is secured a bevel gear 148 (Figs. 3, 6) which is rotated by bevel gear 149 located on shaft 150 rotatably supported by bearings 151, 152.

The maintenance of the saw blade 2 in a plane perpendicular to stock 1 is effected in the following manner. Bevel gear 153 is fixed on the upper portion 154 of the support 147. Gear 155 engages gear 153 during the revolution of arm 13 about center pivot 3 and turns shaft 156 which is rotatably supported in bearings 157, and also gear 158 to rotate gear 159 fixedly secured to the motor support 140. The latter is thus rotated with respect to arm 13 but is maintained at the same orientation to the ground.

The motor 19, as best shown in Figs. 1 and 6, drives a shaft 175 through a coupling 174. Shaft 175 is rotatably mounted in bearings 176 and 177. Bearing 176 is located in the hub 170' of the cover 170. Bearing 177 is located in the enlarged portion 160' of the drive shaft 160. On shaft 175 is mounted a sun gear 178 (Figs. 6, 8) which meshes with two planetary gears 168 both meshing with the inner indentations of a ring gear 169. Planetary gears 168 are rotatably mounted on pins 167 fixedly mounted in a planetary gear carrier 166 fixed on the enlarged portion 160' of shaft 160. The hub 166' of the carrier 166 is rotatably carried in a bearing 164 in a bore of the housing 299. The ring gear 169 is fixed on the rim 299' of housing 299. The drive shaft 160 is rotatably carried in bearing 163, which is arranged in a bore of the sleeve portion 299a of housing 299. Cover 170 and housing 299 are screwed together thus forming a unitary rotatable body rotatably mounted at one end in bearing 172 and at the other end in bearing 171, both bearings 171, 172 being mounted on a base 298. Coupling 161 connects drive shafts 160 and 150 to transmit a torque to the arm 13.

The racks 300 and 301 have a round cross-section throughout their length and are provided with teeth through portions of their length. Racks 300 and 301, as illustrated in Fig. 7, are connected by cross-members 302 and 306. One end of rack 300 is fixed to member 306 and its opposite end is slidably mounted to member 302. One end of rack 301 is fixed to member 302 and its opposite end is slidably mounted to member 306. Springs 303 react outwardly against collars 304 secured to the ends of the racks 300 and 301.

Rack 300 meshes with a gear 310 and rack 301 with a gear 309. Gears 309, 310 are fixed to the hubs of discs 309a, 310a which act as the connecting parts of the two electro-magnetic couplings 311 and 312. If no electric current flows through either of the electro-magnetic couplings 311 and 312, the gears 309 and 310 will rotate idly on the sleeve portion 299a of the housing 299 about their bearings 314 and 313 if the racks 300 and 301 reciprocate in the direction of arrows 315. By turning on the electric current to one of the couplings 311 or 312, the discs 309a, 310a of the gears 309 or 310 will be engaged with the couplings through magnetic attraction and because the couplings 311 and 312 are fixedly mounted on the hub of housing 299, any movement of the respective racks 300 or 301 will rotate the housing 299 thereby increasing or decreasing the angular velocity of the arm 13 about the center pivot 3.

Referring to Figs. 2, 4 and 7, the racks 300, 301 are reciprocated by an adjustable crank mechanism now to be described. The cross member 302 is provided with a vertical groove 196 slidably receiving a pin 197. The latter has portion 198 (Fig. 4) slidably mounted within a longitudinal recess 199 formed in a crank 200 having a shaft portion 201 rotatably mounted in bearings 202, 203. Portion 198 is internally threaded to receive and engage an externally threaded spindle 204 rotatably mounted in bearings 205, 206 and extending through recess 199. A gear 207 is secured to one end of spindle 204 and engages a gear 208 secured to a shaft 209 rotatably mounted in bearings 210, 211.

A bevel gear 212 is fixed on shaft 209 and engages another bevel gear 213 mounted on the end of a shaft 214 extending through an axial bore 215 formed in the shaft portion 201 of crank 200. Shaft 214 is rotatably mounted at one end in a bearing 216 and its opposite end is connected by a coupling 217 to the output shaft 218 of an electric motor 129. It will thus be seen that actuation of motor 219 causes rotation of the spindle 204 to move pin 197 radially inwardly or outwardly with respect to the axis of rotation of crank 200. Hence the eccentricity of pin 197 with respect to said axis of rotation may be adjusted to increase or decrease the length of the stroke through which racks 300, 301 are reciprocated when crank 200 is rotated.

Crank 200 is drivingly connected to arm 13 so that the former will rotate 180° for every complete 360° cycle of revolution of the latter. A bevel gear 220 (Figs. 2, 4) is formed on shaft portion 201 and engages a bevel gear 221 fixed on one end of a shaft 222 rotatably mounted in bearings 223, 224. To the opposite end of shaft 222 there is fixedly secured a bevel gear 225 engaging a bevel gear 226 mounted on shaft 150. The shaft 150 thus drives and rotates both arm 13 and crank 200, the various gear ratios being such that arm 13 completes a full revolution for each one half revolution of crank 200, as noted above.

Whenever arm 13 is at the midpoint of the cutting portion of its cycle of rotation, that is, perpendicular to the longitudinal axis of the stock 1 as shown in the drawings, crank 200 will be either in the "dead-center" position or in the opposite "dead-center" position 180° removed therefrom. Hence racks 300, 301 will be at either extremity of their reciprocal strokes and will be reversing in direction when arm 13 is at said midpoint of the cutting portion of its cycle of rotation. Since the velocity of racks 300, 301 will be zero at this point, they will exert no influence on the differential gear mechanism connecting drive motor 19 with shaft 150 (Fig. 6). However, during other portions of the cycle of rotation of arm 13, racks 300, 301 will be in motion to drive the ring gear 169 of the differential gear mechanism and thereby will increase or decrease the angular velocity of arm 13. By selectably energizing either electro-magnetic coupling 311 or 312 during the movement of racks 300, 301 in a particular direction, the angular velocity of arm 13 may be increased or decreased during the non-cutting portion of its cycle of revolution, as may be desired.

The energizing current to the electro-magnetic couplings 311, 312 is switched on and off at the proper instant by a switch 401 (Fig. 1) actuated by engagement with arm 13 as the latter approaches the dead-center cutting position. It is desirable to engage one of the couplings 311, 312 shortly before arm 13 reaches the dead-center position and to disconnect the other engaged coupling somewhat beyond this position. This is to make sure that both couplings will never be disconnected at the same time, which would be detrimental to the accuracy of the lengths of stock severed. The very small longitudinal displacement occurring between the two racks 300 and 301 during the time interval of a small fraction of a second in which both couplings are connected will be taken care of after the disengagement of one coupling and obviated by the action of the springs 303 (Fig. 7).

Switch 401 is of conventional construction, and since several types of switches for accomplishing the energization of electromagnetic couplings 311, 312 in the manner described above are well-known in the art, the structural details of switch 401 will not be described in view of the fact that they form no part of the inventive concept of the present application.

As shown in Figs. 1 and 2, disc wheel 225 is rotated in the direction of arrow 226 by bevel gear 148 engaging bevel gear 227 (Fig. 3) on shaft 228 carried in bearings 229. A pair of spur gears 230 are fixed on shafts 228 and 231 (Fig. 1), the latter being mounted in bearings 232. Shaft 231 supports disc wheel 225. One bearing 232 is located in support 233 and the other bearing 232 is in support 234. Projections 235 guide the advance lever 236 which is pivotally supported on pin 237. The lever 236 has a bifurcated upper head 236a into which the stock 1 enters during the swinging movement of the lever. A curved cam track 238 provided on support 233 cooperates with a recessed follower 239 of lever 236 and swings the same and the stock 1 towards the saw 2 and away from it.

The rolling stock 1 is transported on rolls 240 which are inclined relative to the advance direction 4 of the stock 1 in order to make sure that the stock 1 keeps in contact with the guide ledge 241 of the roller track 241'.

A horizontal circular disc 242 is secured on pivot 3 and extends into the roller track recess 241a. The disc has a cutout 243 composed of a straight portion and a circular portion. The bifurcated head 236a of lever 236 is moved into the straight recess portion and lowered from the plane of the latter shortly before, during and after the cutting operation to guide the rod 1 during its movement towards the saw 2 and to return rod 1 again. The circular portion of the cut-out 243 provides clearance for the relative rotation of saw blade 2 and motor 7. Next to motor 7 a sector-shaped plate 244 is provided and is located in the same plane as disc 242 and carries the section of the rod 1 to be cut. After the cut is performed, the disc 242 closes the recess 241a in the roller track 241' thereby providing a flat support for the rolling stock 1.

Another embodiment of the invention is illustrated in Figs. 9 to 13, where the saw blade 2 circulates in a horizontal plane which is situated above the rolling stock. The rotation of the center pivot 3 is here performed in the same manner as described above. The corresponding part of the drive mechanism is shown in Fig. 9 and is identical to the drive mechanism illustrated in Figs. 1 to 8.

Bevel gear 148 which is mounted on the center pivot 3 is driven by bevel gear 149 mounted on drive shaft 150. Center pivot 3 is rotatably mounted in bearings 253 (Fig. 9) and 254 (Fig. 10) located in the lower portion 255 and the upper portion 259, respectively, of a housing. Revolving arm 13 and its head 11 is mounted on the upper portion of pivot 3. The revolving arm 13 may be lowered and raised on pivot 3, whereby the saw blade 2 will be lowered and raised to move its cutting edge to different levels if saw blades of a different diameter are used and if the rolling stock of a different size is to be severed.

Bevel gear 256 is provided with an upper annular recess in which a disc 257 is mounted. The disc 257 is connected to the hub of the revolving arm 13 and is lifted and lowered with the latter. A disc 258 fastened to the upper portion 259 of the housing has a projection 258a which fits into a corresponding groove 256a of the hub of bevel gear 256. In this manner rotation of bevel gear 256 is prevented and it engages bevel gear 260 upon rotation of arm 13.

Shaft 269 which is carried in the bearings 262, and bevel gears 263, 264 serve to hold saw blade 2 and its motor and motor support in a vertical plane perpendicular to the rolling stock by rotation about pivot 143 as described above in connection with Figs. 1–8.

The lifting and the lowering of revolving arm 13 on center pivot 3 is effected by a motor 265 located on a support 266 rigidly mounted to revolving arm 13 through coupling 267, worm gear 268 and a threaded shaft 269. Shaft 269 is rotatable in a bore of pivot 3. A shoulder portion 269a of threaded shaft 269 is surrounded by the disc-shaped members 270, 271 which are mounted on the revolving arm 13. Therefore, by rotation of shaft 269 the revolving arm 13 is raised or lowered.

The lifting of the rolling stock 1 towards the saw blade 2 is performed in conformity with this embodiment of the invention by an arcuate segmental guide member 289 (Fig. 13) which is pivoted outwardly about bolt 273 located in a guide wheel 274 when the revolving saw blade arrives in the cutting position A. In Figs. 12 and 13 letter "A" indicates the initial position of the saw blade 2, "B" the medium position, and "C" the position of the saw blade 2 after the completion of the cutting operation.

The initial position of the saw blade 2 is shown in Fig. 12 in full lines and positions "B" and "C" are shown in dotted lines. In Fig. 13 the saw blade 2 is shown in full lines in the "C" position at the completion of the cut and in dotted lines in the "B" and "A" positions. The rod 1 which extends horizontally at the commencement of the cut in the direction of arrow 4 has been lifted from this initial horizontal position denoted in Fig. 13 by a dotted line 275 and has been slightly bent.

Guide wheel 274 rotates, as indicated by arrow 276, in the same direction and with the same speed as the advancing rolling stock 1. This rotation is derived from the center pivot 3 through bevel gears 277 and 278 (Fig. 9), the latter being mounted on shaft 279 mounted in the bearing 280, 280a. One bearing 280 is located in the lower part 255 of the housing and the other bearing 280a is mounted in the support 281.

The right-hand portion of guide wheel 274 is fixedly mounted on shaft 279. The hub 282 (Fig. 12) of a bellcrank lever 283, 284 is rotatably located in the bore of the other half portion. Lever arm 283 is attached to the hub 282 exteriorly of the bore of wheel 274 and lever arm 284 provided with apertures 285 and 286 is located within the guide wheel 274. A spring 287 is inserted in aperture 286 of lever arm 284 and in the aperture 288 of a lug attached to the inside of wheel 274. The segmental guide member 289 is connected with the lever arm 284 of hub 282 by a link 292. A pin 293 connects link 292 and guide member 289 and a pin 285 connects link 292 with lever arm 284.

Normally the guide segment 289 in its lowermost position, where it is held by a spring 294, cooperates with wheel 274 to form a continuous circular guide groove for the rolling stock 1.

A crank mechanism provided on support 281 rotates in the direction of arrow 295 and comprises a crank pin 296 (Figs. 9, 11 and 12) which engages the lever arm 283 for a certain time interval and moves the latter for a small distance in the direction opposite to the direction of rotation of guide wheel 274. Accordingly, the segmental guide member 289 is swung about the bolt 273 by rotation of the link 292 about the pin located in the aperture 285 of lever arm 284. Spring 287 is pulled by the movement of member 289 from the position shown in Fig. 12 to the position shown in Fig. 13. As soon as the pin 296 has been turned for a sufficient distance from the position shown in Fig. 12, it releases the lever arm 283. Spring 287 hereupon returns the segmental guide member 289 to its normal position shown in Fig. 12. The operation of member 302, Fig. 9, and its coordinated parts is identical to that of the similar member 302 shown in Figs. 1-8 and described above in connection therewith.

Referring now to Fig. 14, there is shown another modified form of the apparatus, and, more specifically, a different arrangement for raising the stock 1 into cutting engagement with saw blade 2 of the modification shown in Figs. 9 and 10.

Reference numeral 2 designates the saw blade circling in the direction of arrow 5 during the performance of the cutting operation. In the dotted position "A" the saw blade starts the cutting of stock 1, dotted position "B" is the midpoint of the cutting movement and the position "C" shows in full lines the blade after the cut. The stock 1 advances in the direction of arrow 4 and is transported on roll 6 and enters a driving device consisting of two driven rolls 340 rotating in the direction of arrows 341 and 342 and mounted on support 343. Then the stock or rod 1 enters a grooved channel 345 supported at one end on support 344 by a pin 346 about which it can swing in a horizontal plane the channel 345 is supported at the other end on support 348 by a slidable member 347. Pivotally connected with grooved channel 345 is another grooved guide 329 by means of hinge 349. Guide 329 is shown in the uppermost position and slides perpendicular to the plane of the drawing on bar 351 if both guides 345 and 329 are moved endwise in said perpendicular direction by the rotation of a threaded spindle 350 (Figs. 14 and 15). The latter displaces the sliding member 360 having a pin within a socket 359 secured to guide 329. Numeral 350 designates the slanted upper edge of guide 329, which is clear of and below the lower edge of the saw blade 2.

The raising of guide 329 to the uppermost position shown in Fig. 14 performs automatically the cutting of the oncoming stock 1, the speed of the stock 1 and the rotating speed of the saw blade being equal. The downward movement of guide 329 in the direction of arrow 361 is provided by air cylinder 357 mounted on support 348 and actuating a link 356, double lever 355, link 354 and rod 352 in bearings 353. The pieces cut-off from stock 1 fall on rolls 6a of track 358 and are transported off in direction of arrow 4a.

The invention has been described with reference to several preferred embodiments and it will be understood that many variations and modifications thereof may be resorted to without departure from the scope of the invention as defined in the following claim. Therefore, it is intended that the disclosure in the drawings and the above description be deemed as merely illustrative rather than as limiting the scope of the invention.

Having thus described the invention, what I claim as new and desire to be secured by Letters Patent, is as follows:

A gear mechanism, for use in connection with an arm rotatably mounted, said gear mechanism comprising driving means for rotating the arm at a first substantially constant angular velocity during a portion of a cycle of rotation of the arm and for rotating the arm at a different angular velocity during the remainder of the cyle of rotation of the arm, said driving means including a sun gear, a planetary gear engaging said sun gear, a ring gear engaging said planetary gear, adjustable means in driven connection with said driving means and operable for rotating said ring gear at a different selectively adjustable angular velocity during said remainder of a cycle of rotation than during said portion thereof, and means connecting said planetary gear to the arm for rotation thereof in response to rotation of the planetary gear about the axis of said sun gear, said means for rotating said ring gear comprising a pair of gears, a pair of racks, each engaging one of said pairs of gears, reciprocally movable means connected to said racks for reciprocating said racks in unison in response to reciprocal movement of said movable means, clutch means releasably drivingly connecting one of said pair of gears to said ring gear when the racks move in one direction and for releasably drivingly connecting the other one of said pair of gears to said ring gear when said racks move in the opposite direction, and means driven from said driving means and operable for reciprocating said reciprocally movable means during different portions of a cycle of rotation of the arm, said clutch means comprising a pair of electromagnetic clutches, each being drivingly connected between one of said pairs of gears and said ring gear, and switch means actuatable in response to a predetermined angular position of said arm for controlling the energization of said electromagnetic clutches.

References Cited in the file of this patent

UNITED STATES PATENTS

| | | |
|---|---|---|
| 1,039,124 | Harbrecht | Sept. 24, 1912 |
| 1,136,137 | Hunter | Apr. 20, 1915 |
| 2,332,013 | Rudert et al. | Oct. 19, 1943 |
| 2,376,429 | Harry | May 22, 1945 |
| 2,392,349 | Webb | Jan. 8, 1946 |
| 2,399,493 | Luehrs et al. | Apr. 30, 1946 |
| 2,535,774 | Armelin | Dec. 26, 1950 |